US012002640B1

(12) United States Patent
Dai et al.

(10) Patent No.: US 12,002,640 B1
(45) Date of Patent: Jun. 4, 2024

(54) CONTROL SYSTEM OF AN ELECTROMAGNETIC RELAY AND ELECTROMAGNETIC RELAY

(71) Applicant: Shenzhen Hesung Innovation Technology Co., LTD, Guangdong (CN)

(72) Inventors: Xianglu Dai, Guangdong (CN); Jun Ye, Guangdong (CN); Lu Chen, Guangdong (CN); Haisong Qin, Guangdong (CN); Aimin He, Guangdong (CN)

(73) Assignee: SHENZHEN HESUNG INNOVATION TECHNOLOGY CO., LTD, Guangdong (CN)

( * ) Notice: Subject to any disclaimer, the term of this patent is extended or adjusted under 35 U.S.C. 154(b) by 0 days.

(21) Appl. No.: 18/498,471

(22) Filed: Oct. 31, 2023

(30) Foreign Application Priority Data

Feb. 28, 2023 (CN) .......................... 202320452350.6

(51) Int. Cl.
*H01H 47/00* (2006.01)
*H01H 47/22* (2006.01)
(52) U.S. Cl.
CPC ........... *H01H 47/001* (2013.01); *H01H 47/22* (2013.01)
(58) Field of Classification Search
CPC ....... H01H 47/00; H01H 47/001; H01H 47/22

USPC .................................................. 361/139, 206
See application file for complete search history.

(56) References Cited

U.S. PATENT DOCUMENTS

| 3,824,434 A * | 7/1974 | Boley | H01H 50/021 |
| | | | 361/198 |
| 8,130,482 B2 * | 3/2012 | Yang | H01F 7/1838 |
| | | | 361/189 |
| 10,460,896 B2 * | 10/2019 | Sugisawa | H02M 3/156 |
| 2012/0162847 A1 * | 6/2012 | Suzuki | H01H 51/065 |
| | | | 361/206 |

FOREIGN PATENT DOCUMENTS

| CN | 106128858 | 11/2016 |
| CN | 110299264 | 10/2019 |

* cited by examiner

*Primary Examiner* — Yemane Mehari
(74) *Attorney, Agent, or Firm* — ArentFox Schiff LLP

(57) ABSTRACT

Provided are a control system of an electromagnetic relay and an electromagnetic relay. The control system of an electromagnetic relay includes an electromagnet coil, a first resistor, and a first voltage control element. A first terminal of the electromagnet coil is connected to a first terminal of a first power circuit through the first resistor. A second terminal of the electromagnet coil is connected to a second terminal of the first power circuit. The first voltage control element is connected in parallel to the electromagnet coil. The first voltage control element can control the magnitude of the voltage across the electromagnet coil, so that the force to which armature iron is subjected gradually changes.

9 Claims, 5 Drawing Sheets

CONTROL SYSTEM OF AN ELECTROMAGNETIC RELAY AND ELECTROMAGNETIC RELAY

CROSS-REFERENCE TO RELATED APPLICATION(S)

This application claims priority to Chinese Patent Application No. 202320452350.6 filed Feb. 28, 2023, the disclosure of which is incorporated herein by reference in its entirety.

TECHNICAL FIELD

The present disclosure relates to the field of an electromagnetic relay and, in particular, to a control system of an electromagnetic relay and an electromagnetic relay.

BACKGROUND

An electromagnetic relay is an electronic control device and is a common element for controlling a relatively large current and a relatively high voltage through a relatively small current and a relatively low voltage. The electromagnetic relay has a control system (also called an input circuit) and a controlled system (also called an output circuit). A small current is applied to the electromagnet of the input circuit to generate an electromagnetic force to control the movement of the armature iron of the output circuit, so that the output circuit is connected or disconnected. Since it is necessary to avoid an electric arc discharge phenomenon when contact points are in a disconnection state, the disconnection distance of the contact points cannot be too small. Thus, the movement distance of the armature iron is relatively large, and a large electromagnetic field is required to attract the armature iron when the armature iron is at the farthest end. In addition, it is necessary to maintain good contact when the contact points are closed, that is, the contact resistance is small, a large contact force is required, and heat generation is reduced. A relatively large magnetic force causes relatively large acceleration. As a result, the impact speed between the armature iron, an iron core, and a contact point is relatively large. Further, large noise is caused, which interferes with the life and work of users.

Patent CN201610721247.1 discloses performing noise reduction in the transmission path of noise, sealing an electromagnetic relay inside a structure, and wrapping a sound absorption material. This approach may add additional structures and costs and is not conducive to heat dissipation of the relay. Patent CN201810233120.4 discloses a scheme for segmentally controlling the current of an electromagnet coil. This approach requires additional control circuits, which is complex to control and high in costs. With the use of the relay, the change in the elastic structure in a relay may weaken the control effect of contact points of the relay and cannot ensure the noise reduction effect.

Therefore, there is an urgent need for an electromagnetic relay having low costs and a good noise reduction effect.

SUMMARY

The present disclosure provides a control system of an electromagnetic relay and an electromagnetic relay to solve the problem of high costs, complex control, and low service life of the existing electromagnetic relay.

According to one aspect of the present disclosure, a control system of an electromagnetic relay is provided. The control system of an electromagnetic relay includes an electromagnet coil, a first resistor, and a first voltage control element. A first terminal of the electromagnet coil is connected to a first terminal of a first power circuit through the first resistor. A second terminal of the electromagnet coil is connected to a second terminal of the first power circuit. The first voltage control element is connected in parallel to the electromagnet coil. The first voltage control element can control the magnitude of the voltage across the electromagnet coil, so that the force to which armature iron is subjected gradually changes.

Optionally, the first voltage control element is a capacitor.

Optionally, when the electromagnet coil changes from a power-off state to a power-on state, the voltage across the electromagnet coil gradually increases from 0 to a rated voltage under the control of the first voltage control element, and the force to which the armature iron is subjected gradually increases. When the electromagnet coil changes from the power-on state to the power-off state, the voltage across the electromagnet coil gradually decreases from the rated voltage to 0 under the control of the first voltage control element, and the force to which the armature iron is subjected gradually decreases.

Optionally, the rated voltage across the electromagnet coil satisfies the formula: $U=R/(R+R1)*U1$.

U denotes the rated voltage across the electromagnet coil. R denotes the internal resistance of the electromagnet coil. R1 denotes the resistance value of the first resistor. U1 denotes the voltage of the first power circuit.

Optionally, the voltage across the electromagnet coil satisfies the formula: $0<U2<U$, and $0<U3<U$.

U2 denotes the voltage across the electromagnet coil when the armature iron starts to move due to the change of the electromagnetic coil from the power-off state to the power-on state. U3 denotes the voltage across the electromagnet coil when the armature iron starts to move due to the change of the electromagnetic coil from the power-on state to the power-off state.

Optionally, the time required for the voltage across the electromagnet coil to change from 0 to the rated voltage or from the rated voltage to 0 is adjusted by the capacitance value of the capacitor or the resistance value of the first resistor.

Optionally, a second voltage control element is connected in parallel to two ends of the first resistor. The second voltage control element is configured to increase the voltage across the electromagnet coil after the preset time when the electromagnet coil changes from the power-off state to the power-on state.

Optionally, the second voltage control element is a triode. The collector electrode of the triode is connected to a first terminal of the first resistor. The emitter electrode of the triode is connected to a second terminal of the first resistor. The base electrode of the triode is connected to the positive electrode of a second power supply.

Optionally, the second voltage control element is configured to be turned on to short-circuit the first resistor after the preset time when the electromagnet coil changes from the power-off state to the power-on state.

According to another aspect of the present disclosure, an electromagnetic relay is provided. The electromagnetic relay includes any control system of an electromagnetic relay described above.

In the technical solutions of the present disclosure, the voltage across the electromagnet coil of the electromagnetic relay gradually increases or decreases through the first voltage control element, so that the electromagnetic field gradually increases or decreases. Thus, the force to which the armature iron is subjected gradually changes. In this manner, a large impact speed is avoided, and the noise of the electromagnetic relay is reduced. Moreover, it is possible to ensure that the contact points of the electromagnetic relay are pressed into contact when closed, thereby reducing heat generation and improving the service life of the electromagnetic relay.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

To illustrate technical solutions in embodiments of the present disclosure more clearly, drawings used in description of the embodiments are briefly described below. Apparently, the drawings described below are merely part of the embodiments of the present disclosure, and those of ordinary skill in the art may obtain other drawings based on the drawings described below on the premise that no creative work is done.

DETAILED DESCRIPTION

For a better understanding of the solutions of the present disclosure by those skilled in the art, the technical solutions in embodiments of the present disclosure are described clearly and completely in conjunction with the drawings in the embodiments of the present disclosure. Apparently, the embodiments described below are part, not all, of the embodiments of the present disclosure. Based on the embodiments of the present disclosure, all other embodiments obtained by those of ordinary skill in the art should be within the scope of the present utility mode on the premise that no creative work is done.

It is to be noted that the terms "first" and "second" in the description, claims, and drawings of the present disclosure are used to distinguish between similar objects and are not necessarily used to describe a particular order or sequence. It should be understood that the data used in this way is interchangeable when appropriate so that the embodiments of the present disclosure described herein can also be implemented in a sequence not illustrated or described herein. In addition, the terms "include", "have" and any other variations thereof are intended to encompass a non-exclusive inclusion. For example, a process, method, system, product, or equipment that includes a series of steps or units not only includes the expressly listed steps or units but may also include other steps or units that are not expressly listed or are inherent to such process, method, product or equipment.

Embodiment One

Figure 1:
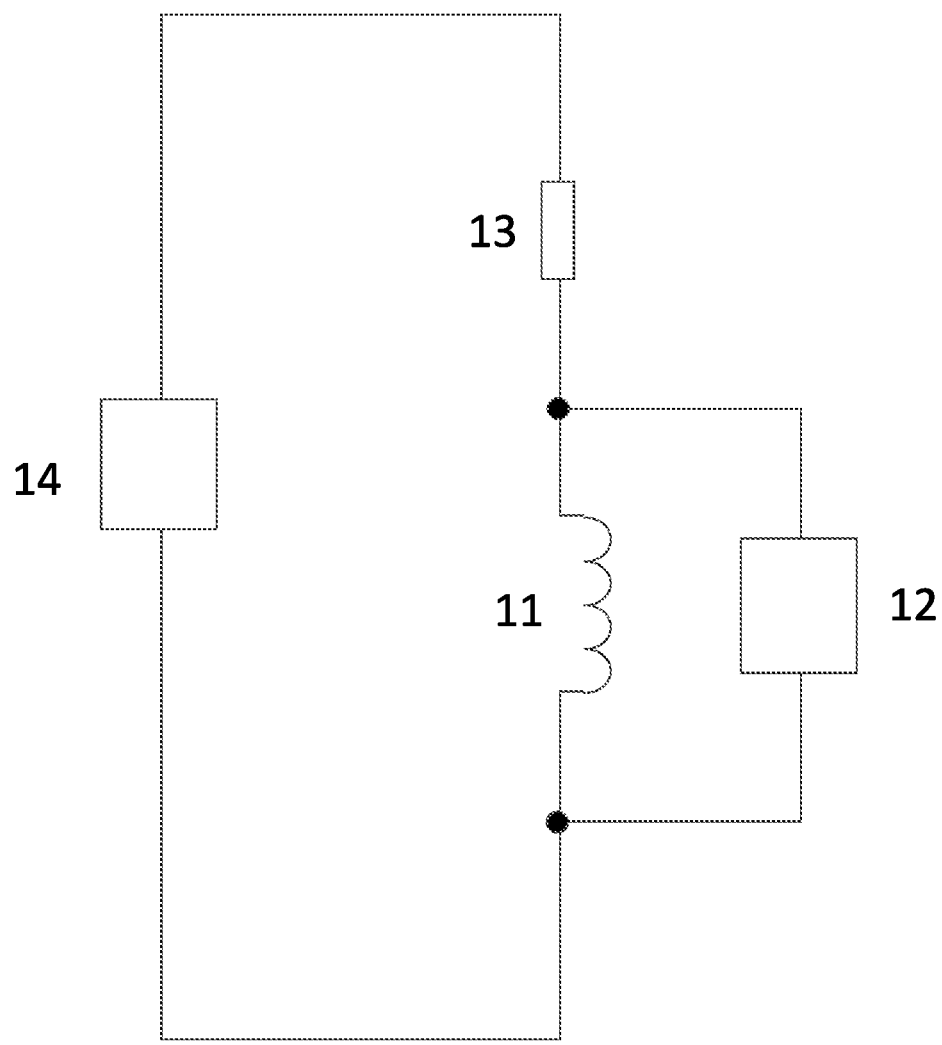
FIG. 1 is a diagram illustrating the structure of a control system of an electromagnetic relay according to embodiment one of the present disclosure.

FIG. 1 is a diagram illustrating the structure of a control system of an electromagnetic relay according to embodiment one of the present disclosure. As shown in FIG. 1, the control system 10 of an electromagnetic relay includes an electromagnet coil 11, a first resistor 13, and a first voltage control element 12. A first terminal of the electromagnet coil 11 is connected to a first terminal of a first power circuit 14 through the first resistor 13. A second terminal of the electromagnet coil 11 is connected to a second terminal of the first power circuit. The first voltage control element 12 is connected in parallel to the electromagnet coil 11. The first voltage control element 12 can control the magnitude of the voltage across the electromagnet coil 11, so that the force to which armature iron is subjected gradually changes.

Specifically, the first power circuit 14 can provide a constant voltage to the control system 10 of an electromagnetic relay. The first voltage control element 12 can control the voltage across the electromagnet coil 11 to gradually increase or decrease, so that the magnitude of the electromagnetic field generated by the electromagnet coil 11 gradually increases or decreases. Further, the electromagnetic force to which the armature iron is subjected gradually increases or decreases. When the electromagnetic force to which the armature iron is subjected reaches the force required for the movement of the armature iron, the armature iron starts to move. Compared with the existing electromagnetic relay, at this time, the acceleration of the movement of the armature iron is small. The armature iron impacts the electromagnet coil or a stop apparatus with small acceleration, so that the noise of the electromagnetic relay is reduced. In this embodiment, when the control system 10 of an electromagnetic relay changes from a power-off state to a power-on state, the voltage across the electromagnet coil 11 gradually increases under the control of the first voltage control element 12. The electromagnetic field generated by the electromagnet coil 11 gradually increases. The electromagnetic force to which the armature iron is subjected gradually increases. When the electromagnetic force to which the armature iron is subjected increases to the force required for the movement of the armature iron, the armature iron starts to move. The contact points of the electromagnetic relay are closed. At this time, the armature iron starts to impact the electromagnet coil 11 with relatively small acceleration. The noise generated is relatively small. After the contact points of the electromagnetic relay are closed, as the electromagnetic field generated by the electromagnet coil 11 further increases, the electromagnetic force between the armature iron and the electromagnetic coil 11 further increases. The contact points of the electromagnetic relay are further compressed. In this manner, loosening of the contact points of the electromagnetic relay caused by the change in the internal elastic structure during use of the electromagnetic relay is avoided, and it is ensured that the contact points are pressed into contact when closed. Thus, heat generation is reduced, and it is beneficial to improve the service life of the electromagnetic relay. When the control system 10 of an electromagnetic relay changes from the power-on state to the power-off state, the voltage across the electromagnet coil 11 gradually decreases under the control of the first voltage control element 12. The electromagnetic field generated by the electromagnet coil 11 gradually decreases. The electromagnetic force to which the armature iron is subjected gradually decreases. When the electromagnetic force to which the armature iron is subjected decreases to the force required for the movement of the armature iron, the armature iron starts to move. The contact points of the electromagnetic relay are opened. At this time, the armature iron is still attracted by an electromagnetic force, so that the armature iron impacts the stop apparatus with relatively small acceleration, and the noise generated is relatively small.

The control system of an electromagnetic relay according to an embodiment of the present disclosure includes an electromagnet coil, a first resistor, and a first voltage control element. The first terminal of the electromagnet coil is connected to the first terminal of the first power circuit through the first resistor. The second terminal of the electromagnet coil is connected to the second terminal of the first power circuit. The first voltage control element is connected in parallel to the electromagnet coil. The first voltage control element can control the magnitude of the voltage across the electromagnet coil, so that the force to which the armature iron is subjected gradually changes. In the control system of an electromagnetic relay provided by the present disclosure, the voltage across the electromagnet coil of the electromagnetic relay gradually increases or decreases through the first voltage control element, so that the electromagnetic field gradually increases or decreases. Thus, the force to which the armature iron is subjected gradually changes. In this manner, a large impact speed is avoided, and the noise of the electromagnetic relay is reduced. Moreover, it is possible to ensure that the contact points of the electromagnetic relay are pressed into contact when closed, thereby reducing heat generation and improving the service life of the electromagnetic relay.

Figure 2:
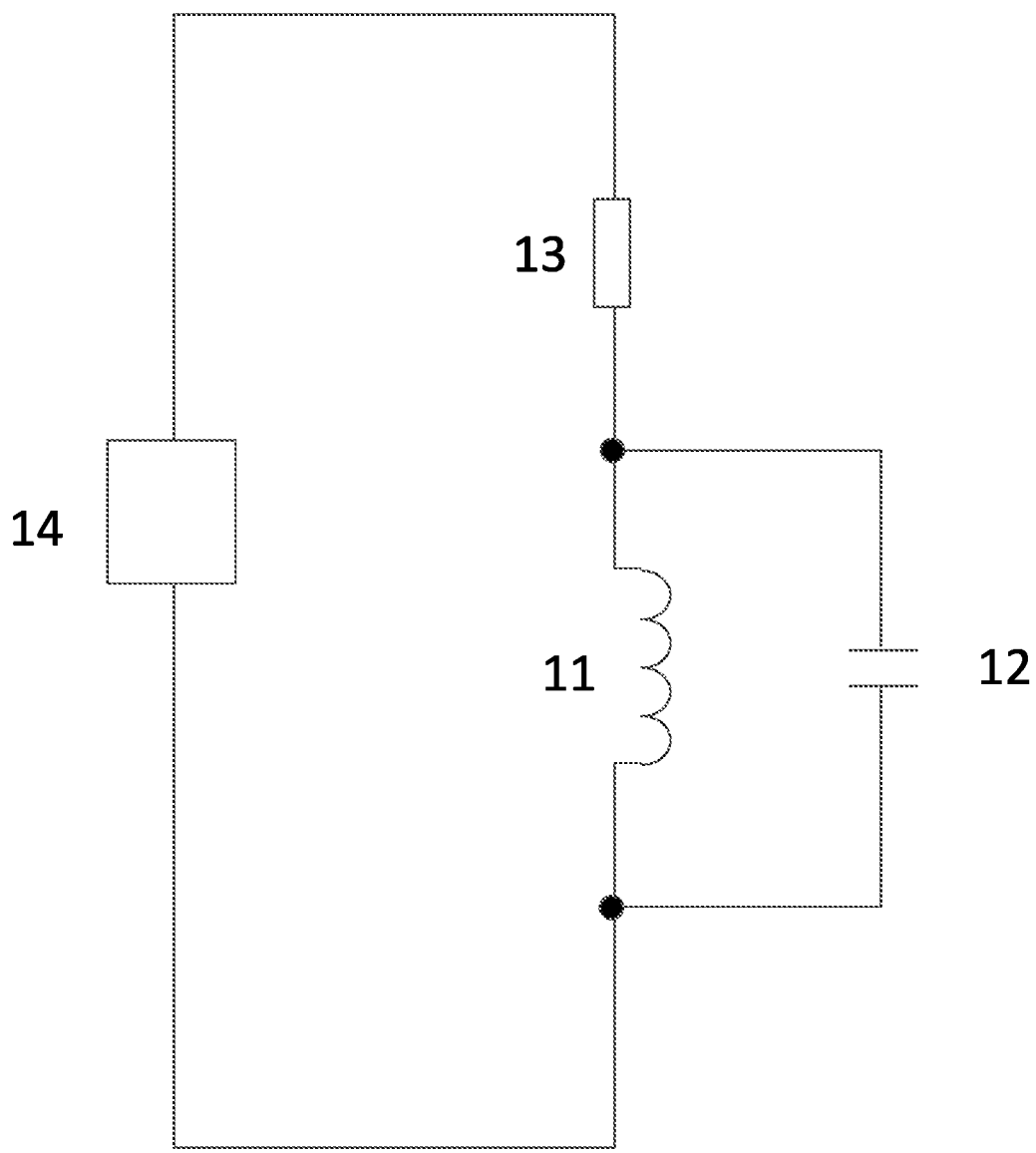
FIG. 2 is a diagram illustrating the structure of another control system of an electromagnetic relay according to embodiment one of the present disclosure.
Figure 3:
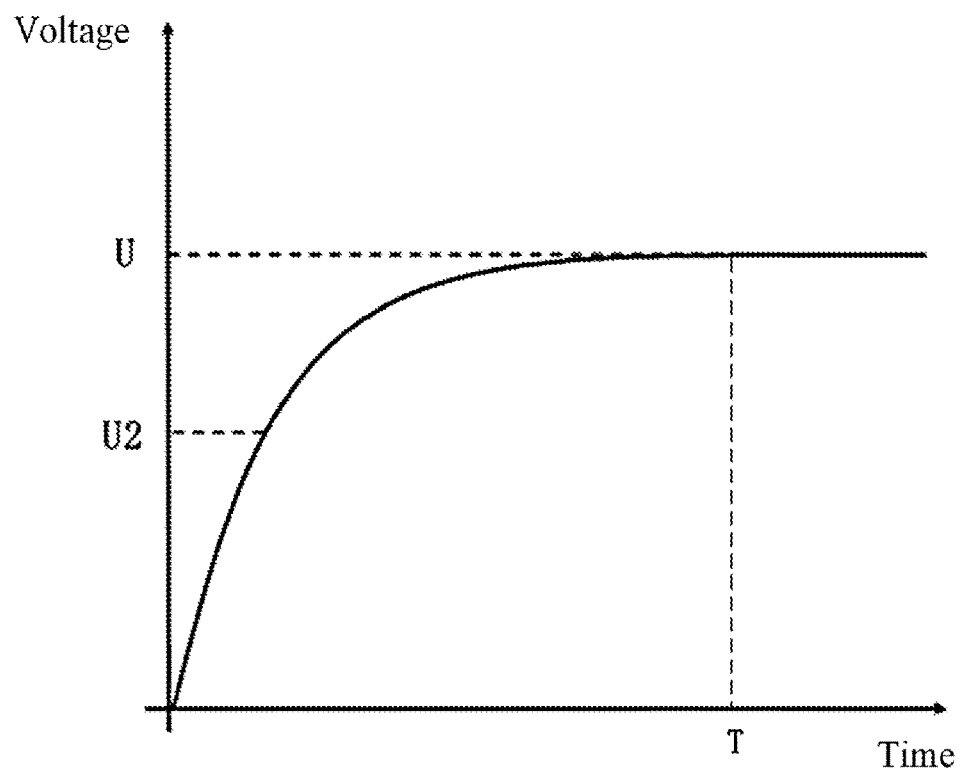
FIG. 3 is a relationship diagram illustrating that the voltage across an electromagnet coil changes with time when the electromagnet coil changes from a power-off state to a power-on state.

Optionally, FIG. 2 is a diagram illustrating the structure of another control system of an electromagnetic relay according to embodiment one of the present disclosure. As shown in FIG. 2, the first voltage control element 12 is a capacitor. FIG. 3 is a relationship diagram illustrating that the voltage across an electromagnet coil changes with time when the electromagnet coil changes from a power-off state to a power-on state. As shown in FIG. 3, when the electromagnet coil 11 changes from the power-off state to the power-on state, due to the charging characteristic of the capacitor, the voltage across the electromagnet coil 11 gradually increases from 0 to a rated voltage U. The electromagnetic field generated by the electromagnet coil 11 gradually increases. The electromagnetic force to which the armature iron is subjected gradually increases. When the voltage across the electromagnet coil 11 increases to U2, the electromagnetic force to which the armature iron is subjected increases to the force required for the movement of the armature iron. Thus, the armature iron starts to move. The contact points of the electromagnetic relay are closed. At this time, the armature iron starts to impact the electromagnet coil 11 with relatively small acceleration. The noise generated is relatively small. After the contact points of the electromagnetic relay are closed, as the capacitor is charged, the voltage across the electromagnet coil 11 continuously increases. The electromagnetic field generated by the electromagnet coil 11 further increases. The electromagnetic force between the armature iron and the electromagnetic coil 11 further increases. The contact points of the electromagnetic relay are further compressed. In this manner, loosening of the contact points of the electromagnetic relay caused by the change in the internal elastic structure during use of the electromagnetic relay is avoided, and it is ensured that the contact points are pressed into contact when closed. Thus, heat generation is reduced, and it is beneficial to improve the service life of the electromagnetic relay.

Figure 4:
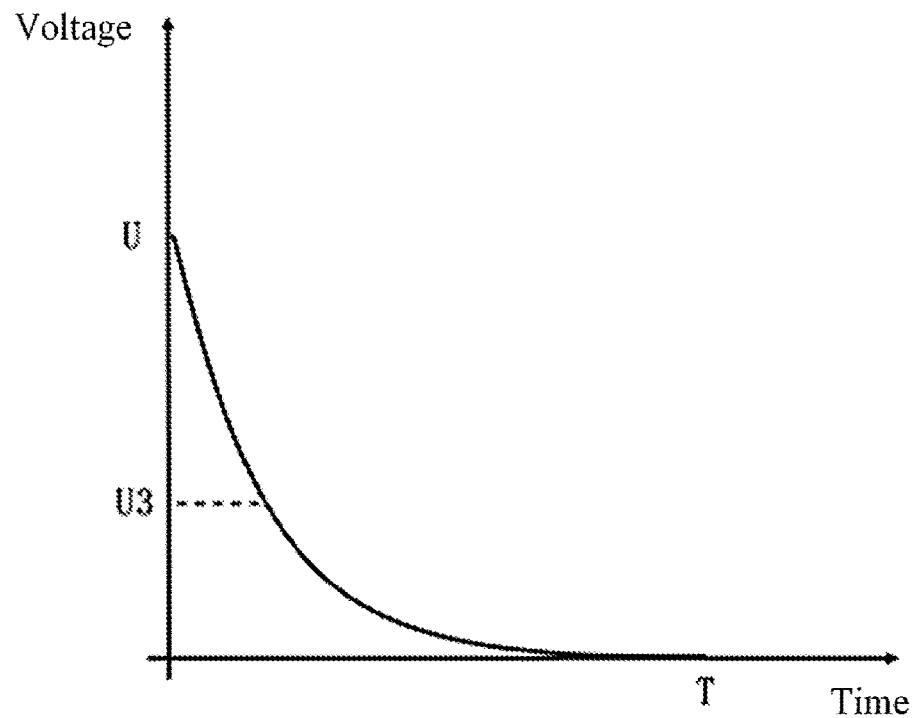
FIG. 4 is a relationship diagram illustrating that the voltage across an electromagnet coil changes with time when the electromagnet coil changes from a power-on state to a power-off state.

FIG. 4 is a relationship diagram illustrating that the voltage across an electromagnet coil changes with time when the electromagnet coil changes from a power-on state to a power-off state. As shown in FIG. 4, when the electromagnet coil 11 changes from the power-on state to the power-off state, the capacitor gradually discharges. The voltage across the electromagnet coil 11 gradually decreases from the rated voltage U to 0. The electromagnetic field generated by the electromagnet coil 11 gradually decreases. The electromagnetic force to which the armature iron is subjected gradually decreases. When the voltage across the electromagnet coil 11 decreases to U3, the electromagnetic force to which the armature iron is subjected decreases to the force required for the movement of the armature iron. Thus, the armature iron starts to move. The contact points of the electromagnetic relay are opened. At this time, the armature iron is still attracted by an electromagnetic force, so that the armature iron impacts the stop apparatus with relatively small acceleration, and the noise generated is relatively small.

In this embodiment, the rated voltage across the electromagnet coil satisfies the formula:

$$U = R/(R+R1)*U1.$$

U denotes the rated voltage across the electromagnet coil 11. R denotes the internal resistance of the electromagnet coil 11. R1 denotes the resistance value of the first resistor 13. U1 denotes the voltage of the first power circuit 14.

The voltage across the electromagnet coil satisfies the formula: $0<U2<U$, and $0<U3<U$.

U2 denotes the voltage across the electromagnet coil 11 when the armature iron starts to move due to the change of the electromagnetic coil 11 from the power-off state to the power-on state. U3 denotes the voltage across the electromagnet coil 11 when the armature iron starts to move due to the change of the electromagnetic coil 11 from the power-on state to the power-off state.

Optionally, the time required for the voltage across the electromagnet coil 11 to change from 0 to the rated voltage or from the rated voltage to 0 is adjusted by the capacitance value of the capacitor or the resistance value of the first resistor 13.

Embodiment Two

Figure 5:
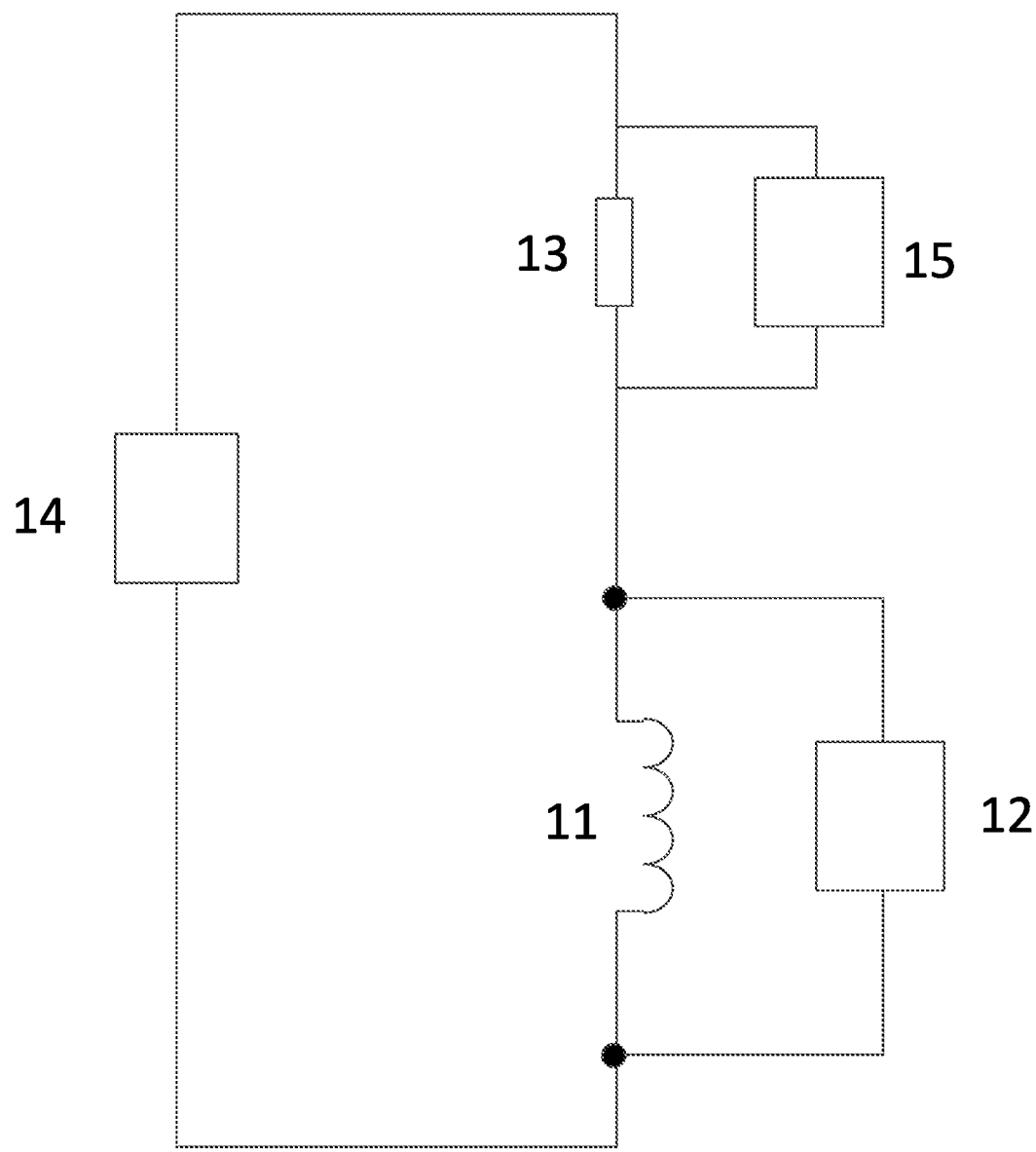
FIG. 5 is a diagram illustrating the structure of another control system of an electromagnetic relay according to embodiment two of the present disclosure.

FIG. 5 is a diagram illustrating the structure of another control system of an electromagnetic relay according to embodiment two of the present disclosure. As shown in FIG. 5, on the basis of the preceding embodiment, a second voltage control element 15 is connected in parallel to two ends of the first resistor 13. The second voltage control element 15 is configured to increase the voltage across the electromagnet coil 11 after the preset time when the electromagnet coil 11 changes from the power-off state to the power-on state. In this embodiment, the preset time may be greater than or equal to the time required for the voltage across the electromagnet coil 11 to change from 0 to the rated voltage.

Specifically, when the control system 10 of an electromagnetic relay changes from the power-off state to the power-on state, the voltage across the electromagnet coil 11 gradually increases under the control of the first voltage control element 12. The electromagnetic field generated by the electromagnet coil 11 gradually increases. The electromagnetic force to which the armature iron is subjected gradually increases. When the electromagnetic force to which the armature iron is subjected increases to the force required for the movement of the armature iron, the armature iron starts to move. The contact points of the electromagnetic relay are closed. At this time, the armature iron starts to impact the electromagnet coil 11 with relatively small acceleration. The noise generated is relatively small. After the contact points of the electromagnetic relay are closed, as the electromagnetic field generated by the electromagnet coil 11 further increases, the electromagnetic force between the armature iron and the electromagnetic coil 11 further increases. The contact points of the electromagnetic relay are further compressed. After the preset time when the electromagnet coil 11 changes from the power-off state to the power-on state, the voltage across the electromagnet coil 11 further increases under the control of the second voltage control element 15. Thus, the electromagnetic force between the armature iron and the electromagnetic coil 11 further increases. The contact points of the electromagnetic relay are further compressed. Further, it is ensured that the contact points are pressed into contact when closed. Thus, heat generation is reduced, and it is beneficial to improve the service life of the electromagnetic relay.

In this embodiment, the second voltage control element 15 can be turned on to short-circuit the first resistor 13 after the preset time when the electromagnet coil 11 changes from the power-off state to the power-on state, thereby increasing the voltage across the electromagnet coil 11.

Figure 6:
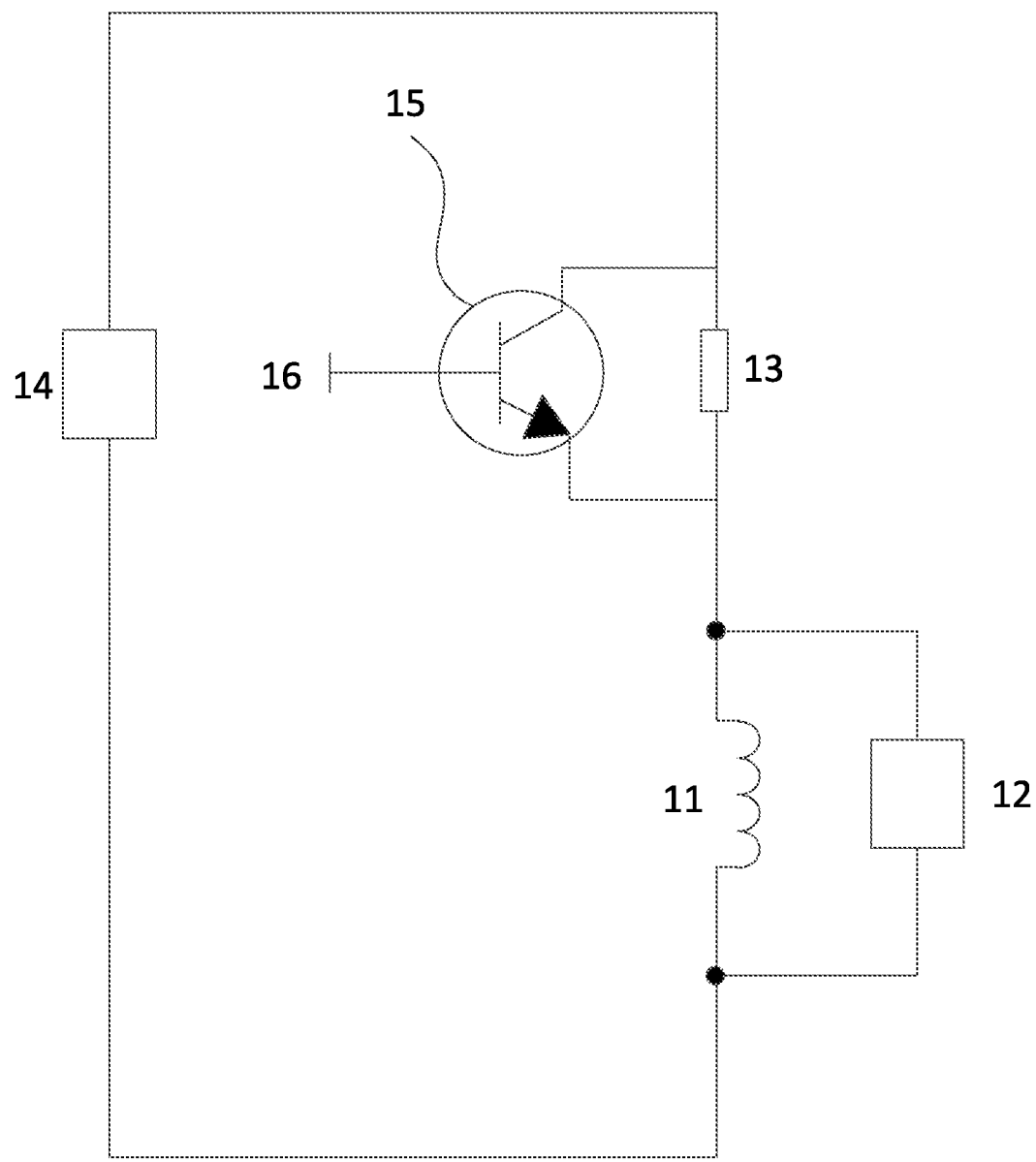
FIG. 6 is a diagram illustrating the structure of another control system of an electromagnetic relay according to embodiment two of the present disclosure.

FIG. 6 is a diagram illustrating the structure of another control system of an electromagnetic relay according to embodiment two of the present disclosure. As shown in FIG. 6, optionally, on the basis of the preceding embodiment, the second voltage control element 15 is a triode. The collector electrode of the triode is connected to a first terminal of the first resistor 13. The emitter electrode of the triode is connected to a second terminal of the first resistor 13. The base electrode of the triode is connected to the positive electrode of a second power supply 16. The triode can be turned on under the control of the second power supply 16 to short-circuit the first resistor 13 after the preset time when the electromagnet coil 11 changes from the power-off state to the power-on state, thereby increasing the voltage across the electromagnet coil 11.

Embodiment Three

Embodiment three of the present disclosure provides an electromagnetic relay. The electromagnetic relay is equipped with the control system of an electromagnetic relay of any preceding embodiment and has corresponding functional circuits and beneficial effects of the control system of an electromagnetic relay of any preceding embodiment.

It is to be understood that various forms of the preceding flows may be used with steps reordered, added, or removed. For example, the steps described in the present disclosure may be executed in parallel, in sequence, or in a different order as long as the desired result of the technical solutions in the present disclosure is achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modifications, equivalent substitutions, improvements and the like made within the spirit and principle of the present disclosure are within the scope of the present disclosure.

What is claimed is:

1. A control system of an electromagnetic relay, comprising:
    an electromagnet coil;
    a first resistor; and
    a first voltage control element, wherein a first terminal of the electromagnet coil is connected to a first terminal of a first power circuit through the first resistor, a second terminal of the electromagnet coil is connected to a second terminal of the first power circuit, the first voltage control element is connected in parallel to the electromagnet coil, the first voltage control element is configured to control magnitude of a voltage across the electromagnet coil, so that force to which armature iron is subjected gradually changes, a rated voltage across the electromagnet coil satisfies a formula: $U=R/(R+R1)*U1$, and U denotes the rated voltage across the electromagnet coil, R denotes an internal resistance of the electromagnet coil, R1 denotes a resistance value of the first resistor, and U1 denotes a voltage of the first power circuit.

2. The control system of the electromagnetic relay according to claim 1, wherein the first voltage control element is a capacitor.

3. The control system of the electromagnetic relay according to claim 2, wherein:
    when the electromagnet coil changes from a power-off state to a power-on state, the voltage across the electromagnet coil gradually increases from 0 to a rated voltage under control of the first voltage control element, and the force to which the armature iron is subjected gradually increases; and
    when the electromagnet coil changes from the power-on state to the power-off state, the voltage across the electromagnet coil gradually decreases from the rated voltage to 0 under the control of the first voltage control element, and the force to which the armature iron is subjected gradually decreases.

4. The control system of the electromagnetic relay according to claim 1, wherein the voltage across the electromagnet coil satisfies a formula: $0<U2<U$, and $0<U3<U$, U2 denotes a voltage across the electromagnet coil when the armature iron starts to move due to a change of the electromagnetic coil from a power-off state to a power-on state, and U3 denotes a voltage across the electromagnet coil when the armature iron starts to move due to a change of the electromagnetic coil from the power-on state to the power-off state.

5. The control system of the electromagnetic relay according to claim 3, wherein time required for the voltage across the electromagnet coil to change from 0 to the rated voltage or from the rated voltage to 0 is adjusted by a capacitance value of the capacitor or a resistance value of the first resistor.

6. The control system of the electromagnetic relay according to claim 1, wherein a second voltage control element is connected in parallel to two ends of the first resistor, and the second voltage control element is configured to increase the voltage across the electromagnet coil after a preset time when the electromagnet coil changes from a power-off state to a power-on state.

7. The control system of the electromagnetic relay according to claim 6, wherein the second voltage control element is a triode, a collector electrode of the triode is connected to a first terminal of the first resistor, an emitter electrode of the triode is connected to a second terminal of the first resistor, and a base electrode of the triode is connected to a positive electrode of a second power supply.

8. The control system of the electromagnetic relay according to claim 6, wherein the second voltage control element is configured to be turned on to short-circuit the first resistor after the preset time when the electromagnet coil changes from the power-off state to the power-on state.

9. An electromagnetic relay, comprising a control system, wherein the control system comprises:
an electromagnet coil;
a first resistor; and
a first voltage control element, wherein a first terminal of the electromagnet coil is connected to a first terminal of a first power circuit through the first resistor, a second terminal of the electromagnet coil is connected to a second terminal of the first power circuit, the first voltage control element is connected in parallel to the electromagnet coil, the first voltage control element is configured to control magnitude of a voltage across the electromagnet coil, so that force to which armature iron is subjected gradually changes, a rated voltage across the electromagnet coil satisfies a formula: $U=R/(R+R1)*U1$, and U denotes the rated voltage across the electromagnet coil, R denotes an internal resistance of the electromagnet coil, R1 denotes a resistance value of the first resistor, and U1 denotes a voltage of the first power circuit.

* * * * *